US010505811B2

(12) United States Patent
Yang et al.

(10) Patent No.: US 10,505,811 B2
(45) Date of Patent: Dec. 10, 2019

(54) MULTI-TERMINAL INTERACTION RELATION MAINTENANCE SYSTEM AND METHOD

(71) Applicants: INSTITUTE OF ACOUTICS, CHINESE ACADEMY OF SCINECES, Beijing (CN); SHANGHAI 3NTV NETWORK TECHNOLOGY CO. LTD., Shanghai (CN)

(72) Inventors: Zhongzhen Yang, Beijing (CN); Jinlin Wang, Beijing (CN); Xue Liu, Beijing (CN); Shoujiang Dang, Beijing (CN); Liheng Tuo, Beijing (CN)

(73) Assignees: INSTITUTE OF ACOUSTICS, CHINESE ACADEMY OF SCIENCES, Beijing (CN); SHANGHAI 3NTV NETWORK TECHNOLOGY CO. LTD., Shanghai (CN)

( * ) Notice: Subject to any disclaimer, the term of this patent is extended or adjusted under 35 U.S.C. 154(b) by 159 days.

(21) Appl. No.: 15/561,075

(22) PCT Filed: Jun. 4, 2015

(86) PCT No.: PCT/CN2015/080757
§ 371 (c)(1),
(2) Date: Sep. 25, 2017

(87) PCT Pub. No.: WO2016/173086
PCT Pub. Date: Nov. 3, 2016

(65) Prior Publication Data
US 2018/0091371 A1    Mar. 29, 2018

(30) Foreign Application Priority Data

Apr. 29, 2015    (CN) .......................... 2015 1 0214026

(51) Int. Cl.
*G06F 15/173* (2006.01)
*H04L 12/24* (2006.01)
(Continued)

(52) U.S. Cl.
CPC .......... *H04L 41/0893* (2013.01); *H04L 29/08* (2013.01); *H04L 41/0859* (2013.01);
(Continued)

(58) Field of Classification Search
CPC . H04L 41/0893; H04L 41/0859; H04L 29/08; H04L 61/2076; H04L 67/1044;
(Continued)

(56) References Cited

U.S. PATENT DOCUMENTS

2011/0051651 A1* 3/2011 Wu ....................... H04L 12/185
370/312
2011/0321113 A1* 12/2011 Bahnck ............ H04N 21/25808
725/131
(Continued)

FOREIGN PATENT DOCUMENTS

CN    102749893 A    10/2012
CN    102761780 A    10/2012
(Continued)

*Primary Examiner* — Philip B Tran
(74) *Attorney, Agent, or Firm* — Gokalp Bayramoglu (57) ABSTRACT

A multi-terminal interaction relation maintenance system and method, the interaction relation is states of performing instruction and data synchronization interaction by a plurality of terminals in the same service instance in a traffic service system. The system comprises an interaction service module and an interaction terminal. Terminals that have an interaction relation belong to the same bounding group, terminals in the same bounding group are served by the same service instance, the interaction service module manages the bounding group based on rules, comprising but not limited to creating, modifying and deleting the bounding group, (Continued)

provides a mutual addressing service for the terminals in the bounding group and also provides a service for a terminal to be bound or unbound with other terminals, and after mutually addressing by means of the interaction service module, terminals interact with each other by means of instruction and data interaction.

8 Claims, 3 Drawing Sheets

(51) Int. Cl.
*H04L 29/08* (2006.01)
*H04L 29/12* (2006.01)

(52) U.S. Cl.
CPC ...... *H04L 61/2076* (2013.01); *H04L 67/1044* (2013.01); *H04L 67/1046* (2013.01); *H04L 67/1048* (2013.01); *H04L 67/16* (2013.01); *H04L 61/6013* (2013.01)

(58) Field of Classification Search
CPC .. H04L 67/1046; H04L 67/1048; H04L 67/16
USPC ................................................ 709/223, 245
See application file for complete search history.

(56) References Cited

U.S. PATENT DOCUMENTS

| | | | |
|---|---|---|---|
| 2014/0157378 A1* | 6/2014 | Childs | H04L 63/102 726/6 |
| 2015/0172114 A1* | 6/2015 | Tarlano | H04L 41/0806 709/220 |

FOREIGN PATENT DOCUMENTS

| | | |
|---|---|---|
| CN | 103179460 A | 6/2013 |
| CN | 103414881 A | 11/2013 |

\* cited by examiner

MULTI-TERMINAL INTERACTION RELATION MAINTENANCE SYSTEM AND METHOD

CROSS REFERENCE TO RELATED APPLICATIONS

This application is the national phase entry of International Application PCT/CN2015/080757, filed on Jun. 4, 2015, which is based upon and claims priority to Chinese Patent Application No. 2015102140260, filed on Apr. 29, 2015, the entire contents of which are incorporated herein by reference.

TECHNICAL FIELD

The present invention relates to the field of network communications, and in particular to a system and method for maintaining an interaction relation among multiple terminals.

BACKGROUND

At present, with the application and development of intelligent terminals, people can use multiple terminals simultaneously, for example, a plurality of mobile phones, intelligent TVs and intelligent household appliances, etc., since different terminals provide different core functions. More comprehensive user experiences on multi-terminal linkages can be provided to a user by interacting multiple terminals and fully exerting the different functional characteristics of multiple terminals.

In linkage relation maintenance, protocols such as DLNA, WIDI, IGRS and the like, are representative protocols, and implementation principles thereof lie in a direct communication between terminals in a local area network, which is limited to the local area network and lays a higher requirement on terminals, and the terminals are required to support a specific protocol. The terminals in a terminal linkage not only include terminals with a screen, but also include all intelligent terminals. The linkage includes operation-level linkage, and the linkage of user information, service information and the like. The above linkage system is irrelevant to services, thus the problem of linkage between different services cannot be solved. Additionally, the maintenance of the linkage relation is accomplished at terminals, not only being inconvenient to manage, but also occupying resources of the terminals.

SUMMARY

It is an object of the invention to provide a system and method for maintaining a linkage relation among multiple terminals, in order to solve the above technical problems.

In order to achieve the above object, the invention provides a system for maintaining a linkage relation among multiple terminals. The system comprising terminals are divided into several binding groups and a linkage service module;

the terminals having a linkage relation are divided into a same binding group, and all the terminals in each binding group are served by a same service instance;

the linkage service module is configured for creating, modifying and deleting a binding group and providing a service for a terminal in each binding group to be bound or unbound with other terminals, and further configured for providing mutual addressing between the terminals in each binding group, thereby performing interaction linkages of instruction and data between the terminals in each binding group;

wherein the linkage relation refers to a correlated state of operations of mutually sending an instruction, a message or data between a plurality of terminals in the same service instance of the same traffic service system.

Optionally, the above linkage service module further comprises:

a receiving submodule configured for receiving an request sent by a terminal, the request comprising a binding request or an unbinding request; wherein a parameter information carried by the binding request comprises an identification of a terminal initiating the binding request, an identification of a terminal to be bound and a service instance identification, the service instance identification being a service instance identification of the terminal initiating the binding request or a service instance identification of the terminal to be bound; and a parameter carried by the unbinding request comprises an identification of a terminal initiating the unbinding request and an identification of a binding group to which the terminal initiating the unbinding request belongs to;

a binding group management submodule configured for deciding to create, modify or delete a binding group based on a rule after receiving a binding/unbinding request;

a terminal state management submodule configured for receiving a notification of a logon, logoff and state change of a terminal, keeping a heartbeat with a logon terminal and maintaining a logon terminal, a logoff terminal and a bound terminal at the same time; and a terminal addressing management submodule configured for maintaining addressing information of the terminals in each binding group; and a terminal conversation management submodule configured for respectively accomplishing the proxy forwarding of a linkage instruction and linkage data between the terminals in the binding group.

A generation rule of the above service instance identification is as follows: a service system after being enabled, registers on the linkage service module and acquires a service identification, and while the traffic service system generates the service instance identification, the traffic service system generates a unique instance identification in a range of its own and combines the instance identification with the service identification into a unique service instance identification; alternatively the traffic service system when needing to generate the service instance identification, applies for the service instance identification from the linkage service module, and the linkage service module generates the unique service instance identification and notifies a service server system of the identification.

Additionally, the invention provides a method for maintaining a linkage relation among multiple terminals. The method comprises:

Step 101) dividing a terminal into a binding group according to an information of a binding request sent by the terminal, wherein the terminals having a linkage relation belong to a same binding group, and all the terminals in each binding group are served by a same service instance;

deleting the terminal or deleting the terminal and the binding group corresponding to the terminal at the same time according to an information of an unbinding request sent by the terminal; and Step 102) providing mutual addressing between the terminals in each binding group based on an address of each terminal collected by a service end, thereby providing interaction linkages of instruction and data between the terminals in each binding group. The linkage relation refers to a correlated state of operations of mutually sending an instruction, a message or data between a plurality of terminals in the same service instance of the same traffic service system. The traffic service system refers to a system that provides a linkage service to a terminal via the linkage service, that is, the traffic service system is PAAS platform which supports other service systems to invoke an interface for the linkage service. The traffic service system is an existing system, which is configured for providing various services to terminal, for example, an instant communication system that provides a social function for a terminal or a video-on-demand system that provides a streaming media service to a user.

The service instance identification has a uniqueness in the device, and the generation rule thereof includes, but is not limited to the following method: a service system after being enabled, registers on the linkage service module and acquires a service identification, and while the traffic service system generates the service instance identification, the traffic service system generates a unique instance identification in a range of its own and combines the instance identification with the service identification into a unique service instance identification within the device; the traffic service system when needing to generate the service instance identification, applies for the service instance identification from the linkage service module, and the linkage service module generates the unique service instance identification within the device and notifies a service server of the identification.

The present invention has the following advantageous effects:

1) with the method and system for maintaining a linkage relation disclosed by the invention, the linkage relation can be maintained based on a rule of a service end, reducing the maintenance cost of a linkage relation for a terminal; and 2) with the invention, the rules in a rule base can be maintained, and the flexibility of linkage relation maintenance can be improved, so that a user can obtain a better interaction experience. The linkage relation can support a plurality of traffic service systems, and serve the plurality of traffic service systems as an independent linkage service, reducing the degree of coupling between the linkage and the traffic service systems.

DETAILED DESCRIPTION OF THE INVENTION

The present invention will be illustrated in detail below in conjunction with the drawings and specific embodiments.

The invention provides a system for maintaining a linkage relation among multiple terminals. The system includes several terminals and a linkage service module.

The terminals are divided into several binding groups, wherein the terminals having a linkage relation belong to a same binding group, and all the terminals in each binding group are served by a same service instance. The specific meaning of the service instance is as follows: the service instance is created and maintained by a service system, the traffic service system provides a service to a terminal via the service instance, and the service instance identification has uniqueness in the system.

The linkage service module is configured for creating, modifying and deleting a binding group, and providing a service for a terminal in each binding group to be bound or unbound with other terminals; and further configured for providing mutual addressing between the terminals in each binding group, thereby providing interaction linkages of instruction and data between the terminals in each binding group;

wherein the linkage relation refers to a correlated state of operations of mutually sending an instruction, a message or data between a plurality of terminals in the same service instance of the same traffic service system.

Optionally, the above linkage service module further includes:

a receiving submodule configured for receiving a request parameter information sent by a terminal, wherein the request parameter also includes a binding request parameter information and an unbinding request parameter information; the binding request parameter information includes an identification of a terminal initiating a binding request, an identification of a terminal to be bound and a service instance identification, the service instance identification being a service instance identification of the terminal initiating the binding request or a service instance identification of the terminal to be bound; and the unbinding request parameter includes an identification of a terminal initiating an unbinding request and an identification of a binding group to which the terminal initiating the unbinding request belongs;

a binding group management submodule configured for deciding to create, modify or delete the binding group based on a rule after the binding/unbinding request is received;

a terminal state management submodule configured for receiving a notification of a logon, logoff and state change of a terminal, keeping a heartbeat with a logon terminal and maintaining a logon terminal, a logoff terminal and a bound terminal at the same time; and a terminal addressing management submodule configured for maintaining addressing information of the terminals in each binding group.

Further optionally, the above binding group management submodule specifically includes:

a binding group creation rule execution unit configured for creating a binding group for a service instance identification carried in the binding request and adding the terminal initiating the binding request and the terminal to be bound into the binding group, if no binding group corresponding to the service instance identification is queried in all the already created binding groups after the binding request initiated by the terminal is received;

a binding group modification rule execution unit configured for adding the terminal initiating the binding request information into a binding group corresponding to the service instance identification carried in the binding request, if the binding group corresponding to the service instance identification is queried in all the already created binding groups after the binding request initiated by the terminal is received; and deleting the terminal initiating an unbinding request from the binding group carried in the request, after the unbinding request initiated by the terminal is received;

a deletion rule execution unit configured for checking, after the terminal initiating the unbinding request from the binding group is deleted, whether there is only one terminal in the binding group, and if yes, deleting the binding group.

A generation rule of the above service instance identification is as follows: a service system after being enabled, registers on the linkage service module and acquires a service identification, and while the traffic service system generates the service instance identification, the traffic service system generates a unique instance identification in a range of its own and combines the instance identification with the service identification into a unique service instance identification; alternatively, the traffic service system when needing to generate the service instance identification, applies for the service instance identification from the linkage service module, and the linkage service module generates the unique service instance identification and notifies a service server system of the identification.

The invention further provides a method for maintaining a linkage relation among multiple terminals, which includes:

Step 101) a terminal is divided into a binding group according to an information of a binding request sent by the terminal, wherein the terminals having a linkage relation belong to a same binding group, and all the terminals in each binding group are served by a same service instance;

a terminal is deleted or the terminal and the binding group corresponding to the terminal are deleted at the same time according to an information of an unbinding request sent by the terminal;

Step 102) mutual addressing is provided between the terminals in each binding group based on an address of each terminal collected by a service end, thereby interaction linkages of instruction and data are performed between the terminals in each binding group.

Optionally, the above Step 101) further includes:

Step 101-1), after the binding request initiated by the terminal is received, if no binding group corresponding to the service instance identification carried in the binding request is queried in all the already created binding groups, the binding group is created for the service instance identification, and the terminal initiating the binding request and the terminal to be bound are added into the binding group;

after the binding request initiated by the terminal is received, if the binding group corresponding to the service instance identification carried in the binding request is queried in all the already created binding groups, a terminal that does not belong to the binding group originally is added into the binding group corresponding to the service instance identification;

Step 101-2) after the unbinding request initiated by the terminal is received, the terminal initiating the unbinding request is deleted from the binding group carried in the request;

after the terminal initiating the unbinding request is deleted from the binding group, it checks whether there is only one terminal in the binding group, and if yes, the binding group is deleted.

The above Step 101-1) specifically includes:

Step 101-1-1) the terminal to initiate a binding request accesses a binding interface provided;

Step 101-1-2) a parameter corresponding to the binding request are acquired according to a parameter acquisition method provided on the binding interface, wherein the parameter includes an instance identification and an identification of a terminal to be bound;

Step 101-1-3) the terminal initiates the binding request carrying the parameter corresponding to the binding request;

Step 101-1-4) after the binding request from the terminal is received, it finds whether there is a binding group corresponding to the service instance identification carried in the binding request, and if yes, it turns to Step 101-1-5); otherwise, it turns to Step 101-1-6);

Step 101-1-5) the binding terminal is added into the existing binding group, and it turns to Step 101-1-7);

Step 101-1-6) the binding group is created, and the terminal initiating the request and the terminal to be bound are added into the binding group;

Step 101-1-7) the terminals in the binding group are notified of a binding group information, wherein the binding group information includes an identification of the binding group, the service instance identification and a list of terminal identifications;

Step 101-1-8) a flow of the binding service is completed.

Further optionally, the above Step 101-2) further includes:

101-2-1) a bound terminal accesses an unbinding interface;

101-2-2) the bound terminal acquires a corresponding parameter according to a method for acquiring a unbinding request parameter provided on the interface;

101-2-3) the bound terminal initiates the unbinding request carrying the unbinding request parameter;

101-2-4) after the unbinding request from the terminal is received, the terminal initiating the unbinding request is deleted from the list of terminal identifications of the binding group;

101-2-5) the terminals in the binding group are notified of a terminal unbinding operation result;

101-2-6) it checks whether there is only one terminal identification in the list of terminal identifications of the binding group, and if yes, it turns to 101-2-7); otherwise, it turns to 101-2-8;

101-2-7) the binding group is deleted, and it turns to 101-2-8);

101-2-8) a flow of the unbinding service is completed.

Embodiment

Figure 1:
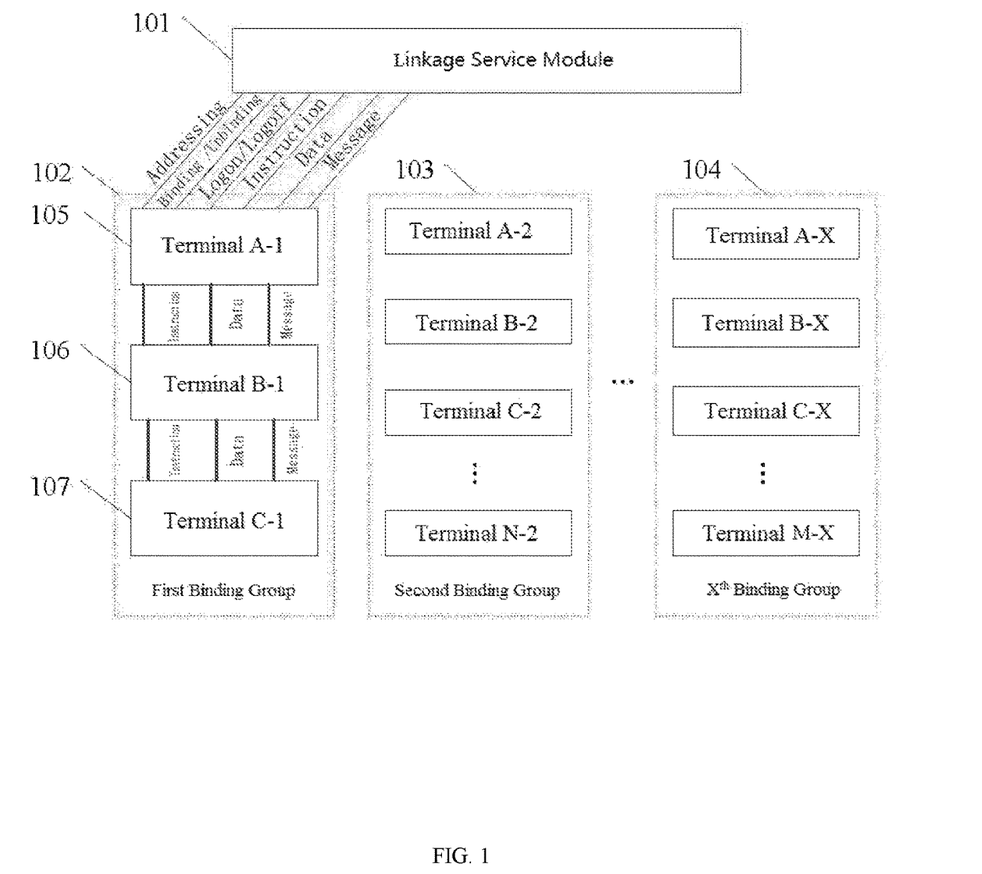
FIG. 1 is a schematic diagram showing a structural composition of a device and a method for maintaining a linkage relation.

The structural composition of a system and a method for maintaining a linkage relation shown in FIG. 1 includes:

a linkage service module 101; a plurality of binding groups, i.e., a first binding group 102, a second binding group 103 and an $X^{th}$ binding group 104; and a plurality of terminals, i.e., a first intelligent TV set 105, a terminal B-1 numbered as 106, a terminal C-1 numbered as 107, a second intelligent TV set and the like. Among them, the first intelligent TV set 105, the terminal B-1 (numbered as 106) and the terminal C-1 (numbered as 107) belong to the first binding group 102.

The linkage service module is responsible for accomplishing functions of binding group management, terminal state management, terminal addressing management, terminal conversation management, instruction proxy and data proxy and the like. The binding group management after receiving a binding/unbinding request from a terminal, decides to create, modify or delete a binding group according to a rule; the state management receives a notification of a logon, logoff and state change of a terminal, and keeps a heartbeat with a logon terminal and maintains a logon terminal, a logoff terminal and a bound terminal at the same time; the addressing management maintains addressing information of the terminals in the binding group; and the instruction proxy and the data proxy respectively accomplish the proxy forwarding of a linkage instruction and linkage data between the terminals in the binding group.

Each binding group includes a plurality of terminals having a linkage relation, and the terminals in one binding group can perform mutual addressing and accomplish linkage. The linkage instruction and linkage data can be directly sent between the terminals in the binding group without compulsory proxy of the linkage service module.

Figure 2:
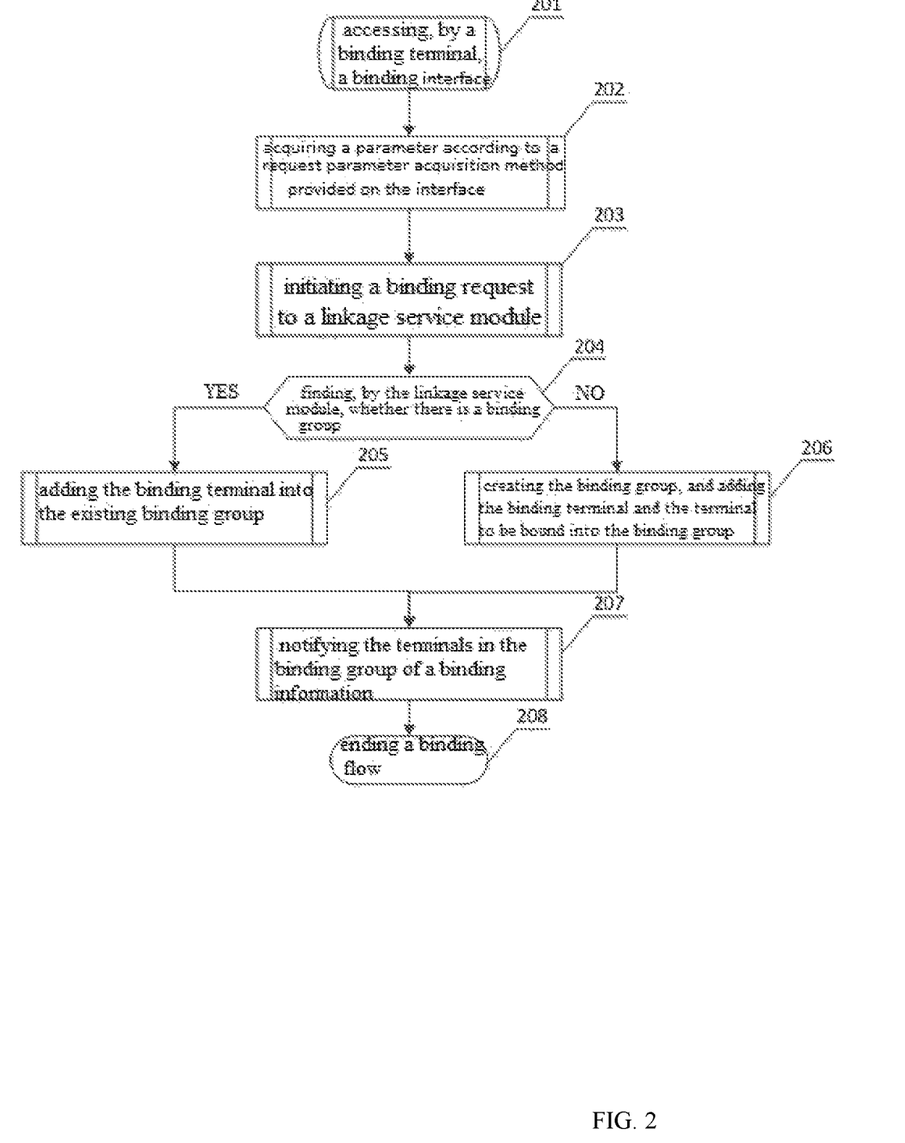
FIG. 2 is a flowchart showing a binding service of a linkage service module provided by an embodiment of the invention.

In this embodiment, it takes an intelligent mobile phone (terminal A-1), an intelligent TV set (terminal B-1) and a video-on-demand service system as an example. The intelligent mobile phone triggers the linkage service module to establish a binding group 1 and realize the functions of initiating a binding/unbinding request and requesting and receiving a state notification, a linkage instruction and linkage data;

The method by which the linkage service module provides a binding service to a terminal is as follows (referring to FIG. 2):

Step 201) the intelligent mobile phone terminal A-1 prepares to initiate a binding request with the intelligent TV terminal B-1 and enters a binding page of the intelligent TV terminal B-1;

Step 202) the intelligent mobile phone terminal A-1 scans a two-dimensional code on the screen of the intelligent TV terminal B-1 via a camera and acquires the device identification of the intelligent TV and an identification of a service instance on the screen of the intelligent TV at this moment, i.e., the video-on-demand service instance identification S;

Step 203) the intelligent mobile phone initiates the binding request to the linkage service module, wherein the request carries the video-on-demand service instance identification S and the device identifications of the intelligent mobile phone and the intelligent TV set;

Step 204) the linkage service module after receiving the binding request from the terminal, finds whether there is a binding group corresponding to the service instance identification carried in the request based on a rule in a rule base, and if yes, it turns to Step 205); otherwise, it turns to Step 206);

Step 206) the linkage service module creates a binding group and adds the intelligent mobile phone terminal A-1 initiating the request and the intelligent TV terminal B-1 into the binding group, and it turns to Step 207);

Step 207) the linkage service module notifies the terminals in the binding group of the identification of the binding group, the service instance identification and a list of terminal identifications, and it turns to Step 208);

Step 208) a flow of the binding service is completed.

Figure 3:
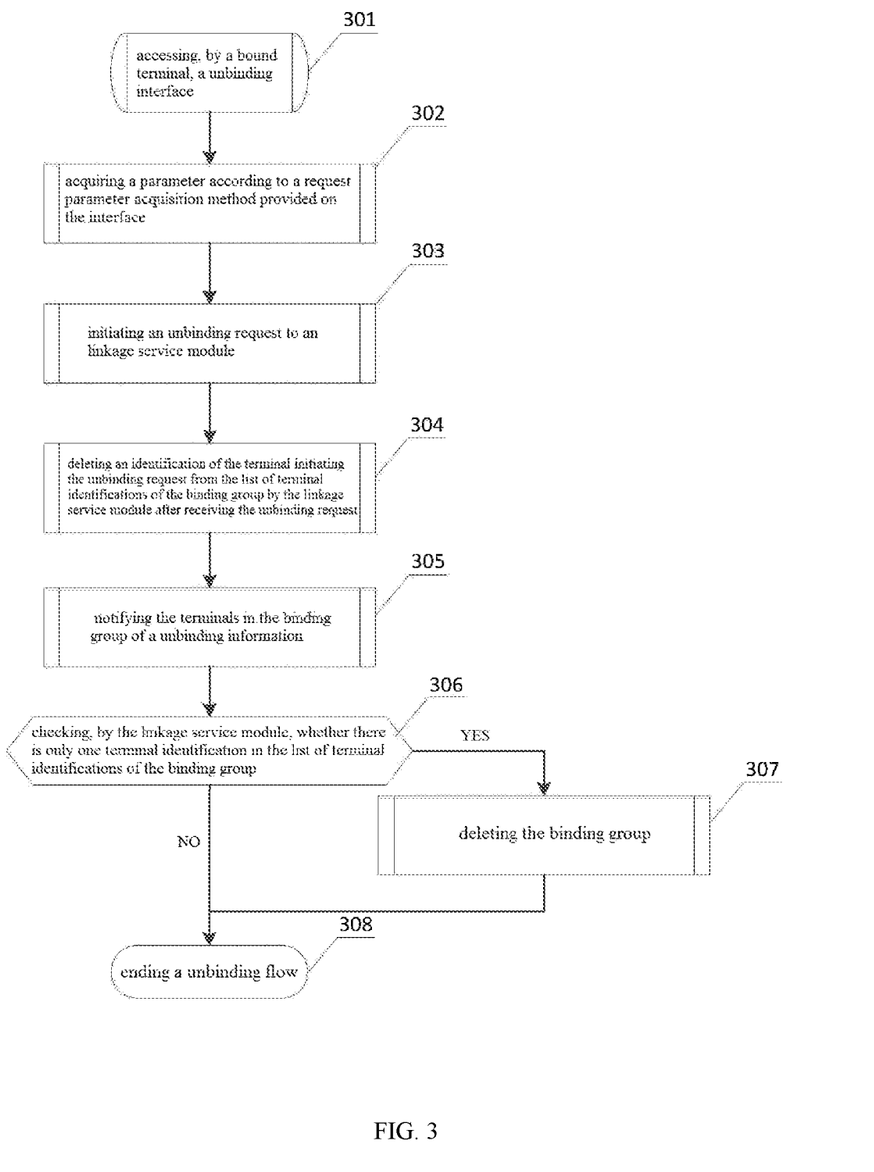
FIG. 3 is a flowchart showing an unbinding service of the linkage service module.

The method by which the linkage service module provides an unbinding service to a terminal is as follows (referring to FIG. 3):

301) the intelligent mobile phone A-1 in the binding group accesses an unbinding interface provided by the linkage service module, and it turns to 302);

302) the intelligent mobile phone A-1 acquires a parameter of an unbinding request by the method provided on an unbinding page of a bound terminal, i.e., the intelligent TV B-1, and it turns to 303);

303) the intelligent mobile phone A-1 initiates the unbinding request carrying the request parameter to the linkage service module, and it turns to 304);

304) the linkage service module after receiving the unbinding request from the intelligent mobile phone A-1, queries the corresponding binding group and deletes the terminal initiating the unbinding request from the list of terminal identifications of the binding group, and it turns to 305);

305) the linkage service module notifies other terminals in the binding group of a terminal unbinding operation result, and it turns to 306);

306) the linkage service module checks whether there is only one terminal identification in the list of terminal identifications of the binding group, if there exists only one terminal identification B-1, it turns to 307); otherwise, turning to 308);

307) the linkage service module deletes the binding group, and it turns to 308);

308) a flow of the unbinding service is completed.

Finally, it should be noted, the examples described herein are only provided for explaining the invention. The invention is not limited to any specific intelligent terminal type or service type, and variations to the above content also fall into the protection scope of the invention.

What is claimed is:

1. A system for maintaining a linkage relation among multiple terminals, comprising: a processor, configured to execute the following program modules stored in a memory;
   a plurality of terminals, wherein the plurality of terminals are divided into a plurality of binding groups and a linkage service module; wherein
   the terminals having a linkage relation are classified as a same binding group, and each terminal in each binding group is served by a same service instance;
   the linkage service module is configured for creating, modifying or deleting the plurality of binding groups and providing a service for the terminals in each binding group to be bound or unbound with other terminals, and the linkage service module further configured for providing a mutual addressing between the terminals in each binding group, thereby performing an interaction linkage of instruction and data between the terminals in each binding group;
   wherein the linkage relation refers to a correlated state of an operation of mutually sending an instruction, a message or data between the terminals in the same service instance of a same traffic service system.

2. The system for maintaining a linkage relation among multiple terminals of claim 1, wherein the linkage service module further comprises:
   a receiving submodule configured for receiving parameter information of an request sent by the terminals, wherein, the request comprises a binding request or an unbinding request; the parameter information carried by the binding request comprises an identification of a terminal initiating the binding request, an identification of a terminal to be bound and a service instance identification, wherein the service instance identification is a service instance identification of the terminal initiating the binding request or a service instance identification of the terminal to be bound; the parameter carried by the unbinding request comprises an identification of a terminal initiating the unbinding request and an identification of the binding groups, wherein the terminal initiating the unbinding request belongs to the binding groups;
   a binding group management submodule configured for deciding a creation, a modification or a deletion of the binding groups based on a rule after receiving the binding/unbinding request;
   a terminal state management submodule configured for receiving a notification of logon, logoff and state change of the terminals, keeping a heartbeat with a logon terminal and maintaining the logon terminal, a logoff terminal and a bound terminal at the same time; and a terminal addressing management submodule configured for maintaining addressing information of the terminals in each binding group.

3. The system for maintaining a linkage relation among multiple terminals of claim 2, wherein the binding group management submodule specifically comprises:

a binding group creation rule execution unit configured for creating a binding group for the service instance identification carried in the binding request and adding the terminal initiating the binding request and the terminal to be bound into the binding group, if no binding group corresponding to the service instance identification is queried in each created binding group after the binding request initiated by the terminal is received;

a binding group modification rule execution unit configured for adding the terminal initiating binding request information into a binding group corresponding to the service instance identification carried in the binding request, if the binding group corresponding to the service instance identification is queried in the each created binding group after the binding request initiated by the terminal is received; and deleting the terminal initiating the unbinding request from the binding group carried in the request, after the unbinding request initiated by the terminal is received; and a binding group deletion rule execution unit configured for checking, after the terminal initiating the unbinding request is deleted from the binding group, checking whether there is only one terminal in the binding group, and if yes, deleting the binding group.

4. The system for maintaining a linkage relation among multiple terminals of claim 2, wherein, a generation rule of the service instance identification is as follows:

a service system after being enabled, registers on the linkage service module and acquires a service identification, and while the traffic service system generates the service instance identification, the traffic service system generates a unique instance identification in a range of the traffic service system itself and combines the instance identification with the service identification into a unique service instance identification; or the traffic service system when needing to generate the service instance identification, applies for the service instance identification from the linkage service module, and the linkage service module generates the unique service instance identification and notifies a service server system of the identification.

5. A method for maintaining a linkage relation among multiple terminals, comprising:

classifying a terminal into a binding group according to information of a binding request sent by the terminal, wherein a plurality of terminals having a linkage relation belong to a same binding group, and each terminal in each binding group is served by a same service instance;

deleting the terminal or deleting the terminal and the binding group corresponding to the terminal at the same time according to information of an unbinding request sent by the terminal; and providing a mutual addressing between the plurality of terminals in each binding group based on an address of each terminal collected by a service end, thereby providing an interaction linkage of instruction and data between the plurality of terminals in each binding group.

6. The method for maintaining a linkage relation among multiple terminals of claim 5, further comprising:

creating a binding group for a service instance identification carried in the binding request and adding a terminal initiating the binding request and a terminal to be bound into the binding group, if no binding group corresponding to the service instance identification is queried in each created binding group after a binding request initiated by the terminal is received;

adding a terminal that does not belong to a binding group originally into the binding group corresponding to the service instance identification carried in the binding request, if the binding group corresponding to the service instance identification is queried in the each created binding group after the binding request initiated by the terminal is received;

deleting a terminal initiating the unbinding request from a binding group carried in the request, after the unbinding request initiated by the terminal is received;

checking whether there is only one terminal in the binding group after the terminal initiating the unbinding request is deleted from the binding group, and if yes, deleting the binding group.

7. The method for maintaining a linkage relation among multiple terminals of claim 6, further comprising:

accessing, by a terminal to initiate the binding request, a binding interface provided;

acquiring a parameter corresponding to the binding request according to a parameter acquisition method provided on the binding interface, wherein the parameter comprises an instance identification and an identification of a terminal to be bound;

initiating, by the terminal, the binding request carrying the parameter corresponding to the binding request;

finding, after receiving the binding request from the terminal, whether there is the binding group corresponding to the service instance identification carried in the binding request, and if yes, adding the binding terminal into an existing binding group, and notifying the terminals in the binding group of binding group information, wherein the binding group information comprising an identification of the binding group, a service instance identification and a list of a plurality of terminal identifications; otherwise creating the binding group, and adding the terminal initiating the request and the terminal to be bound into the binding group; and completing a flow of a binding service.

8. The method for maintaining a linkage relation among multiple terminals of claim 6, further comprising:

accessing, by a bound terminal, an unbinding interface;

acquiring, by the bound terminal, a corresponding parameter according to a method for acquiring a unbinding request parameter provided on the interface; and initiating, by the bound terminal, the unbinding request carrying the unbinding request parameter;

deleting the terminal initiating the unbinding request from the list of the plurality of terminal identifications of the binding group after the unbinding request from the terminal is received;

notifying the terminals in the binding group of a terminal unbinding operation result;

checking whether there is only one terminal identification in the list of the plurality of terminal identifications of the binding group, and if yes, deleting the binding group and completing a flow of an unbinding service; otherwise, completing the flow of the unbinding service.

* * * * *